(12) United States Patent
Rennhard et al.

(10) Patent No.: US 12,235,388 B2
(45) Date of Patent: Feb. 25, 2025

(54) RADAR DEVICE

(71) Applicant: Geopraevent AG, Zürich (CH)

(72) Inventors: Patrick Rennhard, Buch am Irchel (CH); Simon Vogel, Frauenfeld (CH); Roland Küng, Wolfhausen (CH); Lorenz Meier, Zürich (CH)

(73) Assignee: GEOPRAEVENT AG, Zürich (CH)

( * ) Notice: Subject to any disclaimer, the term of this patent is extended or adjusted under 35 U.S.C. 154(b) by 426 days.

(21) Appl. No.: 17/627,736

(22) PCT Filed: Jul. 16, 2020

(86) PCT No.: PCT/EP2020/070114
§ 371 (c)(1),
(2) Date: Jan. 17, 2022

(87) PCT Pub. No.: WO2021/013680
PCT Pub. Date: Jan. 28, 2021

(65) Prior Publication Data
US 2022/0252697 A1    Aug. 11, 2022

(30) Foreign Application Priority Data

Jul. 19, 2019   (CH) .................................. 00927/19

(51) Int. Cl.
*G01S 7/41*   (2006.01)
*G01S 7/35*   (2006.01)
(Continued)

(52) U.S. Cl.
CPC .............. *G01S 7/415* (2013.01); *G01S 7/356* (2021.05); *G01S 13/003* (2013.01); *G01S 13/536* (2013.01); *G01V 3/12* (2013.01)

(58) Field of Classification Search
None
See application file for complete search history.

(56) References Cited

U.S. PATENT DOCUMENTS

| | | | |
|---|---|---|---|
| 9,726,756 B2* | 8/2017 | Jansen | G01S 13/87 |
| 2016/0131742 A1* | 5/2016 | Schoor | H01Q 21/22 |
| | | | 342/128 |

(Continued)

FOREIGN PATENT DOCUMENTS

| | | |
|---|---|---|
| DE | 600 07 307 | 10/2004 |
| DE | 10 2013 212 090 | 1/2015 |

(Continued)

OTHER PUBLICATIONS

D. Zoeke and A. Ziroff, "Phase migration effects in moving target localization using switched MIMO arrays," 2015 European Radar Conference (EuRAD), Paris, France, 2015, pp. 85-88 (Year: 2015).*

(Continued)

*Primary Examiner* — Ladimir Magloire
*Assistant Examiner* — David C. Schultz
(74) *Attorney, Agent, or Firm* — Rankin, Hill & Clark LLP

(57) ABSTRACT

A stationary radar device, which apart from a plurality of stationary receiving antennae, includes a plurality of stationary transmitting antennae for emitting primary radio waves. A frequency-modulated emitting signal is generated in two sequences. During the first sequences a plurality of successive first chirps are emitted by one of the transmitting antennae. A Doppler shift or a speed is computed from the temporal development of the respective first receiving signals. The second sequences are intermitted with the first sequences and each include one or more second chirps, wherein the second chirps are produced from different transmitting antennae. The second receiving signals which are effected by the second chirps are evaluated, in order by way of correlation of receiving signals that originate from second chips, which come from different transmitting antennae, to obtain a phase picture that is resolved in the azimuth.

35 Claims, 4 Drawing Sheets

(51) Int. Cl.
*G01S 13/00* (2006.01)
*G01S 13/536* (2006.01)
*G01V 3/12* (2006.01)

(56) References Cited

U.S. PATENT DOCUMENTS

| | | | | |
|---|---|---|---|---|
| 2017/0045609 | A1* | 2/2017 | Loesch | H01Q 1/3233 |
| 2018/0011170 | A1* | 1/2018 | Rao | G01S 13/42 |
| 2018/0210076 | A1* | 7/2018 | Takada | G01S 7/4913 |
| 2018/0306902 | A1* | 10/2018 | Pernstål | G01S 7/40 |
| 2019/0195984 | A1* | 6/2019 | Goda | H01Q 1/3233 |

FOREIGN PATENT DOCUMENTS

| | | |
|---|---|---|
| DE | 10 2017 106 851 | 10/2018 |
| DE | 10 2018 104 281 | 8/2019 |
| EP | 3 147 685 | 3/2017 |
| WO | WO-0072045 A1 * 11/2000 ......... G01S 13/9023 |

OTHER PUBLICATIONS

Ash et al., "Two-dimensional radar imaging of flowing avalanches", Cold Regions Science and Technology, Mar. 3, 2014, vol. 102, pp. 41-51; cited in the International Search Report.

Ash et al., "FMCW Phased Array Radar for Automatically Triggered Measurements of Snow Avalanches", Radar Conference, Oct. 2011, pp. 166-169; cited in the International Search Report.

Tarchi et al., "MIMO Radar and Ground-Based SAR Imaging Systems: Equivalent Approaches for Remote Sensing", IEE Transactions on Geoscience and Remote Sensing, Jan. 1, 2013, vol. 51, No. 1, pp. 425-435; cited in the International Search Report.

Wilden et al., "MIRA-CLE, an experimental MIMO radar in Ka band", EUSAR 2010, pp. 382-385; cited in the International Search Report.

* cited by examiner

RADAR DEVICE

BACKGROUND OF THE INVENTION

Field of the Invention

The invention relates to a radar device and specifically to a stationary radar device for detecting object movements in a monitored terrain.

Description of Related Art

Amongst radar systems for monitoring a terrain, in particular with regard to natural disasters, there are two categories. The systems that are usually denoted as interferometry radars form a first category. In order to achieve a good resolution in the dimension "range" (distance to the radar antenna) as well as in a direction perpendicularly to this (horizontal, often denoted as "resolution in azimuth"), an antenna with a relatively large extension (aperture) in this direction perpendicular to the beam direction would indeed have to be used. In practise, this effect, apart from a few known systems with a real aperture is mostly achieved with a synthetic aperture, by way of a receiving antenna being assembled on a carriage which is moved perpendicularly to the beam direction during a recording—analogously to the recording from an aircraft or satellite. For this reason, an individual recording usually takes quite some time, for example a minute or more. Interferometry radar systems are therefore suitable for acquiring very slow movements in the terrain, for example movements of a few decimetres to a few meters per day or even per year, by way of comparing subsequently arisen recordings. Herein, suitable correction mechanisms for eliminating the influence of fluctuations of characteristics of the atmosphere must yet be provided for most applications. The determining of such slow movements can be important for prognoses such as, for example, an estimation of the geological risks. Interferometry radar measurements, however, are not suitable for detecting current events such as rock fall or avalanches, in real time.

In contrast, Doppler radar systems are known for this purpose. In Doppler radar systems, the radar echo signal, which is received, for example, by a single receiver antenna or from several receiver antennae, is detected with a high temporal resolution but only with a coarse spatial resolution (for example, only coarsely resolved in the dimension "range" or also additionally with a very coarse resolution in azimuth), and the Doppler shift between the emitting signal and receiving signal is determined by Fourier transformation, from which a speed profile in dependence on the detected spatial coordinates results. Thus, very rapid movements such as, for example, avalanches or rock fall events can be determined in real time, and suitable measures initiated, for example the blocking of a dangerous traffic route.

The state of the art entails various disadvantages. If, for example, very slow movements as well as, in real time, events such as avalanches are to be detected, two radar systems must be operated independently of one another, an interferometry radar system and a Doppler radar system. Firstly, this is accordingly complicated and secondly is unsatisfactory, since measurement results are independent of one another, i.e., it is not possible, at least not without individual analysis by the user, to bring events that are detected by Doppler radar systems in relation to measurement results of interferometry measurement, for example for the purpose of improving the prognosis accuracy. Furthermore, with regard to the hardware hardly any synergies arise, and the frequency bandwidth and sampling frequencies of the two measurement types significantly differ, so that very different demands are placed, for example, on the evaluation electronics. A further disadvantage of Doppler radar measurement is the fact that except from the use of radar devices in a very complicated and therefore expensive embodiment, apart from the mentioned very limited spatial resolution, the detectable range of speeds is quite limited and not much more that a very general warning can be produced before the event.

SUMMARY OF THE INVENTION

It is the object of the invention to remedy this and to provide improved approaches.

According to a first aspect of the invention, a stationary radar apparatus is provided, which includers:
- at least one stationary transmitting antenna for emitting primary radio waves,
- a plurality of stationary receiving antennae for generating receiving signals that are effected by way of secondary radio waves that are thrown back by the terrain on account of the primary radio waves;
- and a control and evaluation unit.

The control and evaluation unit is configured to generate a frequency-modulated emitting signal, which initiates the transmitting antenna or in each case at least one of the transmitting antennae into emitting primary radio waves.

This on the one hand is effected such that the emitting of successive primary radio wave chirps is effected by way of the at least one transmitting antenna in order to determine a Doppler shift and/or a speed from a temporal development of a corresponding (first) receiving signal that originates from successive primary radio wave chirps. The primary radio wave chirps, which are used for this are successive, for example, directly consecutive. However, not taking into account all chirps is not ruled out as an alternative.

On the other hand, a comparison of (processed) second receiving signals, which originate from selected primary radio wave chirps and which are effected by different receiving antennae, is provided, in order to determine an azimuth resolution and to thus create azimuth-resolved data sets (beamforming). A temporal development of the azimuth-resolved data sets is determined from a comparison between data sets, which do not correspond to directly consecutive primary radio wave chirps and which have been obtained, for example, at a greater temporal interval. For the comparison between data sets with regard to the temporary development, one can often advantageously use azimuth-resolved data sets, i.e., in many situations it is advantageous if the azimuth resolution is carried out before the comparison for the purpose of determining the temporal development. Conversely, i.e., carrying out the comparison before the computation of the azimuth resolution is also likewise not to be ruled out, in particular for the detection of movements with medium speeds, at which the atmospheric conditions and influences of the apparatus can be assumed as being constant.

On evaluating the receiving signal for determining the Doppler shift and/or speed (first data sets) as well as for determining the azimuth-resolved data sets (second data sets), a range resolution can be obtained additionally and, for example, in a first step, i.e., before determining the Doppler shift/speed or the azimuth resolution. In particular, this is effected via a Fourier transformation whilst taking into account the fact that with a frequency-modulated primary signal, the frequency difference between the emitting signal and the receiving signal is a measure of the distance. As is known per se, the receiving signal can therefore be mixed with the emitting signal in order (whilst using a low-pass filter for eliminating high-frequency components) to obtain an intermediate frequency signal with the frequency difference. A first (discrete) Fourier transformation of this intermediate frequency signal over the sampling values, which are detected during a chirp results in the range resolution.

The determining of the Doppler shift and/or speed is effected, for example, by way of a second (discrete) Fourier transformation over the chirps, i.e., the range values per chirp are used as input values.

It is possible for a, for example, very coarse azimuth resolution to also be determined from the first data sets by way of the receiving signals, which lead to be first data sets also being captured by different receiving antennae and a comparison taking place, for example via a further Fourier transformation (beamforming with a coarse resolution). A Doppler resolution (or speed resolution) as a function of range and azimuth then results, wherein under certain circumstances the range and azimuth resolution is limited, which, however, on account of the evaluation of the second data sets, can be accepted without further ado.

The determining of the azimuth resolution of the second data sets is effected, for example, likewise with a (discrete) Fourier transformation, with the different receiving antennae signals as input values.

In embodiments, the transmitting antenna emits a continuous sequence of, for example, identical chirps, wherein all chirps are taken into account for the first data sets, whereas a selection is made for the second data sets and, for example, only every thousandth chirp or chirps in even greater distances are taken into account. This procedure is basically possible. However, it can reach its limits, in particular concerning the resolution capacity.

For this reason, for embodiments, in particular one suggests the emitting of the primary radio wave chirps being effected in first sequences and in second sequences.

The first sequences then each form a plurality of successive first chirps, in particular of directly consecutive first chirps and serve for determining the Doppler shift or speed, i.e., the respective receiving signals lead to the first data sets.

The second sequences are formed by at least one second chirp and are emitted between the first sequences or also each during a first sequence. They can be used as the mentioned selected chirps, on the basis of which the azimuth-resolved (second) data sets are determined.

The first chirps herein differ from the second chirps. This, for example, can include one or more of the following differences:

The second chirps can have a larger frequency bandwidth than the first chirps (which permits a finer range resolution, which, however, under certain circumstances requires more time).

The second chirps can be slower than the first chirps, i.e., they can require more time than the first chirps (which does not rule out the frequency change per time (frequency rise as a function of time; see below) being the same as with the first chirps; it can be equal, larger or smaller than with the first chirps);

The second chirps can be emitted from different transmitting antennae, wherein the transmitting antennae differ between the second sequences and/or within the second sequences.

The second chirps can also have different frequency-time characteristics than the first chirps, for example a steeper frequency rise as a function of time, and/or at all events another coding.

Generally, it is the case: the chirps can be positive or negative chirps. As is known per se, the chirps, however, will have monotonously rising or a monotonously dropping frequency time characteristics.

The length and the temporal distribution of the first sequences and of the second sequences can be fixedly defined. However, it is also possible for the sojourn in the first and second sequences to each be adaptively adapted on the basis of a preceding evaluation of data sets. In particular situations, one can even envisage temporally only first sequences or only second sequences being emitted—for example given an acute event.

During the first sequences, a plurality of successive first chirps is emitted by one of the transmitting antennae. The transmitting antenna in each case is always the same during each complete first sequence. The number of the first chirps, which is used for determining the Doppler shift/speed and which, therefore, need to be sent off successively in a rapid manner, is for example at least 500 or at least 1000. This means that if the second sequences lie between the first sequences, then the number of first chirps per first sequence is preferably at least 500 or at least 1000. The first chirps within a first sequence are each, for example, directly consecutive to one another, wherein a (small as possible) distance between successive first chirps can result due to apparatus limits; such a possible distance is generally significantly smaller than the length of a first chirp. For successively following different first sequences, the same transmitting antennae can likewise be used in each case, where, however, one does not rule out the first sequences being generated successively by different transmitting antennae. By way of evaluating the temporal development of the first receiving signal during the first sequence, for each first sequence the Doppler shift or the speed can be determined as a function at least of the distance coordinate (range) and, for example, also as a function of the azimuth angle.

The first data sets—possibly according to the evaluation of the first sequences—serve for the measuring of rapid movements in the terrain, for example of rock fall, avalanches, etc. The evaluation of the respective (first) receiving signals can therefore be effected as is known from Doppler radar measurements.

The spatial resolution, which can be achieved with the first sequences, can be limited: The resolution in "range" (distance to the radar device) is limited by the frequency bandwidth of the first chirps. This in embodiments is less wide than would be permitted within the legal framework, since the chirp repetition frequency determines the maximal unambiguously determinable speed or Doppler shift and it is therefore advantageous if the first chirps last only very shortly. The resolution in the azimuth is limited by the aperture, i.e., the limited extension of the ensemble of receiving antennae, which is used for the evaluation of the first sequences, for example, of an ensemble of antennae, which are arranged directly next to one another in a module.

The second sequences can possibly serve for obtaining data with a larger range resolution and/or azimuth resolution. The second sequences, for example, are intermittent with the first sequences, i.e., one alternates between first and second sequences, wherein a second sequence follows a first sequence without delay and vice versa. The second sequences each includes one or more second chirps, wherein the second chirps can possibly be generated by different transmitting antennae. The latter can be effected by way of second chirps being emitted by different transmitting antennae within each second sequence, and/or by way of transmitting antennae, which are different from second sequence, to second sequence each generating a second chirp. In particular, one can envisage each of the transmitting antennae producing precisely one second chirp (also precisely two, three . . . each, for example, directly consecutive chirps in principle are not to be ruled out) during a cycle, wherein a cycle includes one or more first sequences an equal number of second sequences.

As mentioned, the second chirps in particular can have a larger bandwidth than the first sequences, by which means the achievable resolution in range is accordingly larger.

The second receiving signals, which are effected by the second chirps, are evaluated, in order by way of correlation of receiving signals, which are effected by different receiving antennae, and possibly originate from second chirps, which depart from the different transmitting antennae, to obtain a phase picture and amplitude picture that additionally to the resolution in the range is also resolved in the azimuth.

A combination of the emitting of the primary radio frequency chirps in first sequences with first chirps and second sequences with second chirps, which are different therefrom, and of the use of several transmitting antennae is particularly favourable.

The subject-matter of the invention is therefore in particular a radar device for detecting object movements in a monitored terrain, the device including:
  a plurality of stationary transmitting antennae for emitting primary radio waves,
  a plurality of stationary receiving antennae for generating receiving signals, which are effected by secondary radio waves that are thrown back from the terrain on account of the primary radio waves;
  and a control and evaluation unit;
  wherein the control and evaluation unit is configured to generate a frequency-modulated emitting signal, which each initiates at least one of the transmitting antennae into emitting the primary radio waves,
wherein the control and evaluation unit is configured to effect the emitting of first sequences of in each case a plurality of first successive primary radio wave chirps by way of precisely one of the transmitting antennae and from a temporal development of at least one corresponding first receiving signal to determine a Doppler shift and/or speed, and to effect the emitting of second sequences of in each case at least one second primary radio wave chirp by way of transmitting antennae, which are different within the second sequences and/or between the second sequences, and from a comparison of (processed) second receiving signals, which correspond to the second chirps that depart from the different transmitting antennae and are effected by different receiving antennae, to determine an azimuth resolution.

According to this definition, apart from the fact that the second chirps are effected by different transmitting antennae, the first and second chirps can also differ by way of further characteristics, for example, as mentioned the bandwidth.

Alternatively, it is also possible for several transmitting antennae to be used and for each to emit only one type of sequences in a sequential or possibly simultaneous manner.

For all aspects of the invention, it is the case: on using more than one transmitting antenna, the evaluation unit differentiates between receiving signals which originate from emitting signals of different ones of the transmitting antennae. Each combination of a transmitting antenna with a receiving antenna corresponds to a path of microwave radiation, which is reflected by the terrain, the path being determined by the position of the transmitting antenna and the receiving antenna. From this, given a number n of transmitting antennae and a number m of receiving antennae, a virtual receiving antenna arrangement of n*m virtual receiving antennae results. This multiple input multiple output (MIMO) principle is also known per se for radar images and given a suitable positioning of the transmitting and receiving antennae permits an angular resolution, which is a multiple higher in comparison to the resolution that can be arranged with a mere array of receiving antennae. As is known per se, a phase and amplitude picture, which is resolved in the azimuth, can be determined from the phase differences between the n*m different signals.

For realising the MIMO principle, hence on evaluation of the receiving signals, one must differentiate between receiving signals that originate from the emitting signals of the different transmitting antennae. The time multiplex approach, concerning which, as already mentioned, the emitting signals of the transmitting antennae are not emitted simultaneously but in a successive manner—either in a directly consecutive manner or also at a temporal interval, has been found to be particularly simple and robust. This possibly means that the second chirps of the different transmitting antennae are effected sequentially within a second sequence and/or are emitted in different second sequences.

Other approaches such as a code multiplex method, concerning which at the receiving side one differentiates between the signal components, which originate from the different transmitting antennae on account of a certain signal pattern, are, however, not to be ruled out and are technically doable.

The procedure according to the invention has a series of advantages:

By way of the comparison of the azimuth-resolved data sets, i.e., for example, the comparison of successively recorded phase pictures, slow movements (for example, of up to 1 mm/h and also movements with medium speeds for example between 1 mm/h and 300 mm/h) can be detected. The respective resolution in the azimuth is herein potentially large on account of the large virtual aperture that can be achieved with the procedure according to the invention. The resolution in range can also be comparatively large, amongst other things since more time is possibly available for the second chirps and it can therefore be effected over a significantly broader frequency range than the first chirps.

The approach that is described here therefore, by way of the combination of the mentioned determining of the Doppler shift and/or speed on the one hand with the comparison of the azimuth resolved data sets on the other hand, which is likewise outlined above (for example, possibly by way of the first and second sequences), permits a detection of events, concerning which something in the terrain moves at a higher speed (avalanche, rock fall, dam breaks, etc.) in real time by way of the evaluation of the first sequences, as well as the imaging of the terrain with an high angular resolution and the detection of slow movements by way of comparing the pictures which have successive arisen, for example by way of comparing the phases, with a single stationary radar apparatus. The detection of events in real time by way of the sequence of the successively following primary radio wave chirps permits an event to be ascertained with fractions of a second, i.e., within less than one second, under certain circumstances significantly below one second and for measures to be able to be initiated. Given an interferometric measurement according to the state of the art and under certain circumstances also given the determining of the two data sets according to the teaching which is described here, in contrast is takes, for example, a few seconds until a measurement over the complete virtual aperture region is completed, and the evaluation yet also requires relative much time, since the results of many (virtual) receiving antennae must be combined—this would all be too slow for a reaction to events in real time. Furthermore, possibly the first sequences as mentioned can have a larger chirp repetition frequency than the second, for example combined with a lower bandwidth. By way of this, the unambiguity region of speeds is significantly higher compared to the interferometric measurements, i.e., more rapid movements in the terrain can also be detected.

In contrast, somewhat more time can be available for the evaluation of the second data sets and possibly for the second chirps, since the movements at high speeds are detected by the first sequences. For this reason, more complicated evaluation algorithms can also be used and, for example, larger frequency bandwidths covered even if the frequency change per unit of time within the chirp cannot be set arbitrarily high due to apparative limits (in particular on the part of evaluation), and herewith a larger resolution in range can be achieved—which in turn also permits a detection of very slow movements in the terrain, as is discussed hereinafter.

There are applications in which many advantages are achieved if slow movements as well as movement with medium speeds as well as rapid movements of for example quicker than 300 mm/s up to a few m/s or even up to 50 or 100 m/s (rock fall situations) or even more can be detected. Depending on the application, it is herein not absolutely necessary for the azimuth resolution to also be high (for example, if it is known in any case which object could potentially move—for example, a stone wall that is to be monitored). For such applications, it can be sufficient if the radar device include a single transmitting antenna. The same applies if the radar device includes a very high number of receiving antennae which are arranged for example at regular distances. If, however, this is not the case and a high resolution in the azimuth is also desired, then the aforementioned approach with a plurality of transmitting antennae is a very economical approach, with which the azimuth resolution can be greatly improved by way of a high number of virtual receiving antennae.

A "stationary" radar device here is to be understood as a radar device that can be assembled and operated in a stationary arrangement, thus one which is fixed in location with respect to the ground and includes and/or requires no antennae that are movable with respect to the ground—this being in contrast, for example, to radar devices that are assembled on the aircraft or satellites or in a motor vehicle or radar devices that have carriages on which the antenna are moved and that, as mobile radar devices, are only capable of functioning if the antennae are moved relative to the terrain to be monitored. The radar device often makes do completely without moving parts, wherein the use of aids with moving parts (for example, a fan, a hard disc, or the like) is of course not to be ruled out. One likewise does not rule out the ensemble of radar antenna being rotatable as a whole about a, for example, vertical axis, for example if the terrain to be monitored is not always the same. It can be conceivable, for example, that the same region does not need to be monitored in summer or winter. It is likewise conceivable for a different region to be monitored at night than during the day.

In embodiments, the second data sets (possibly, for example, on the basis of the second sequences) are also evaluated, in order detect movements with medium speeds of for example up to a few mm/s. Such can be important, in order to predict imminent events, for example an imminent dam breakage, rock fall or avalanche. Such a detection of medium speeds with a good azimuth resolution in the georadar region was not possible according to the state of the art, since due to the high necessary repletion rate, the spatial resolution of Doppler radar measurements was not sufficient for this and the applied measuring principles of the interferometry radar measurements with—slowly—moved antennae likewise did not permit such a detection.

For detecting the signals for the purpose of evaluation, the emitting signal can be moved with the associated receiving signal. This is possibly the case during the first sequences as well as during the second sequences. The mixing signal, which is thus obtained, includes signal shares with the sum of frequencies of the emitting signal and receiving signal as well as signal components with the differential frequency $\Delta f$. The signal components with the sum of the frequencies are eliminated by way of a frequency filter. The differential frequency (intermediate frequency) on account of the frequency modulation that is carried out within each chirp (if one firstly disregards a Doppler shift) depends directly on the distance between the radar device and the reflection. Particularly low-frequency components accordingly originate from reflections in the vicinity of the radar device, which often provide little information. They can likewise be eliminated by a further frequency filter (high-pass). Thus, in particular one suggests digitalising and evaluating the intermediate frequency signal. The evaluation steps discussed in this text therefore, in particular, relate to the intermediate frequency signal. In particular they can include a Fourier transformation of the detected signal (of the intermediate frequency signal), which directly provides the range resolution.

As is known per se, a frequency range is passed through by the chirps, in particular the same from chirp to chirp. If the described procedure is selected with first chirps and second chirps, this means that each chirp of a first sequence or of a second sequence can begin at the same initial frequency and pass through the region up to an end frequency, wherein the frequency can change, for example, at least roughly linearly as a function of time, and other courses in dependence on time are also not to be ruled out, for example a triangular signal with an alternating increase and reduction of the frequency, sine modulations.

The first chirps can possibly in particular pass through a part-region of the frequency region through which the second chirps pass, wherein this part-region is less broad, for example, by at least a factor of 2 and, for example, by an even high factor, than the region through which the second chirps pass.

In return, the second chirps can last accordingly longer, for example longer by the same factor.

The radar device in particular can include at least one receiving antenna module with a plurality of receiving antennae, which are arranged next to one another along a, for example, horizontal base line. The distance of the receiving antenna is herein dependent on the required unambiguity region. For example, it can be between roughly half a wavelength (for a large unambiguity region) and one wavelength (for an unambiguity region of approx 60°) or, for example, also up to two wavelengths (if the unambiguity region is only small, i.e., the region to be monitored is greatly restricted). The wavelength relates to the radiation for which the transmitting antennae are designed. For example, given a working frequency around 17 GHz, half a wavelength is just short of 0.9 cm; and other working frequencies of, for example, 10 GHz with accordingly other wavelengths and required antennae distances are also possible. The number of receiving antennae per receiving antennae module can be, for example, between 8 and 32.

Generally, the working frequency can lie below 25 GHz, for example between 8 GHz and 25 GHz, especially at 17 GHz.

If furthermore several transmitting antennae are present, their distance can be selected such that the locations of the virtual receiving antennae, which result by way of the combination of different transmitting antennae with the receiving antennae, do not overlap, but that also no significant gaps result.

According to a first option, this can be effected in particular by way of the distance of adjacent receiving antennae, for example, being roughly half a wavelength up to a wavelength and corresponding to the distance of adjacent virtual receiving antennae, which is to be achieved, and the distance of adjacent transmitting antennae corresponding roughly to the extension of the receiving antennae module, more precisely the receiving antennae number per receiving antenna module being multiplied by the distance between adjacent receiving antennae. The number of transmitting antennae can be, for example, between 2 and 24. The transmitting antennae can be present in optional transmitting antennae modules, with, for example, between 2 and 6 transmitting antennae per transmitting antenna module.

According to an alternative option, transmitting antennae modules with a plurality of transmitting antennae, which lie close to one another, can be combined with receiving antenna modules with receiving antennae, which are distanced corresponding further to one another, so that the virtual receiving antennae that correspond to different transmitting antennae form a staggered arrangement.

With embodiments, the distance between adjacent virtual receiving antenna (which at the same time depending on the embodiment can also correspond to the distance of adjacent real receiving antennae) can be selected in accordance with requirements and be different by roughly half to a complete wavelength. For example, in particular it can be larger if generally only a relatively small region (with respect to the azimuth angle to be covered) is to be monitored, and for very broad regions that are to be monitored it is also possible for the distance to be smaller than half a wavelength. The optimal antenna distance, apart from the width of the region to be monitored can also depend on the characteristics of the applied antennae, in particular on their emitting angle. Given a larger antennae distance, one would use antennae with a narrow field of view (ideally also antennae with only a few side lobes), so that signals are not unambiguously mixed.

In order to achieve a particularly high azimuth resolution, furthermore a plurality of receiving antennae modules each with several receiving antennae and/or a plurality of transmitting antenna modules each with several transmitting antennae can be used.

On using several receiving antennae modules, alternative arrangements of transmitting antennae and receiving antennae result, for example receiving antenna modules that are arranged directly next to one another and transmitting antennae that are arranged at a correspondingly larger distance, etc.

In contrast to the known (slow) SAR radar devices with antennae that move along the base line during a recording, given a stationary radar device of the type that is discussed here the transmitting antennae and/or receiving antennae must be arranged to some extent comparatively remotely from one another for achieving a sufficiently large aperture. The emitting signal and/or the receiving signals must therefore be transmitted over comparatively large distances of, for example, a metre more for generating the mixed signal and thus before the A/D conversion. It is a recognition of the present invention that this can represent challenge on account of the very high demands on the phase stability (the evaluation as mentioned amongst other things includes a comparison of phase pictures). Hence, for example, given temperature fluctuations on account of a non-constant exposure to the sun or other fluctuations which influence the physical dimensions of the transmitting elements, changes of the signal travel times in the electronics and leads can result.

For this reason, according to a second aspect of the invention, one suggests converting the emitting signal into an optical signal after its generation, transmitting it via an optical signal lead and converting it back into an electrical signal before the mixing with the receiving signal and/or before the emitting by the transmitting antennae. It has been found that the optical transmission of such analog emitting signals is particularly suited for the purposes of a stationary radar device with several transmitting antennae and several receiving antennae.

Supplementarily or alternatively to the conversion into an optical signal and converting it back into an electrical signal, the mentioned fluctuations can also be dealt with by way of stable stationary reflectors/regions in the monitored terrain being used in order to calibrate the measurement results.

Supplementarily or as a further alternative, given a signal-transmitting cable one can carry out a travel time measurement, for example by way of reflection measurement or antennae couplings, as are described for example in D.C. Jenn et al., Adaptive phase synchronization in distributed digital arrays published in 2010 NASA/ESA Conference on Adaptive Hardware and Systems, FIG. 3.

In embodiments, in particular one can envisage the emitting signal being generated at a lower frequency and its frequency being multiplied by a fixed factor of for example 3, 4, 5 or 6 at the input side of the respective transmitting antenna and the input side of the mixer. The multiplication for the transmitting antennae on the one hand and the mixer on the other hand can be effected by a common multiplication stage (i.e., the signals for the mixers are branched off after the multiplication) or they can be effected in parallel.

After the frequency multiplication, furthermore—as is known per se—a power amplifier can be provided at the input side of the transmitting antenna. Herein, it is the emitting signal in the lower frequency—in this text also denoted as "first signal"—which is transmitted via the optical signal lead. These embodiments have the advantage that even with emitting signals of for example 17 GHz or 10 GHz or 20 GHz or more they permit the use of robust electro-optical converter and optical signal leads, which is no longer possible without further ado at the frequency of the actual emitting signal.

Apart from a radar device, the present invention also relates to a method for operating a radar device, wherein the control and signal evaluation are effected as is described in this text. The features that are described in the present text and which relate to the operation of the radar device including the control and evaluation can relate to the equipment/ set-up of the radar device as well as to the operating method. They are only described once for avoiding repetition.

BRIEF DESCRIPTION OF THE DRAWINGS

The subject-matter of the invention is hereinafter explained in more detail by way of the accompanying drawings. The same reference numerals in the drawings indicate the same or analogous elements. The drawings are schematic and not true to scale. There are shown.

DETAILED DESCRIPTION OF THE INVENTION

Figure 1:
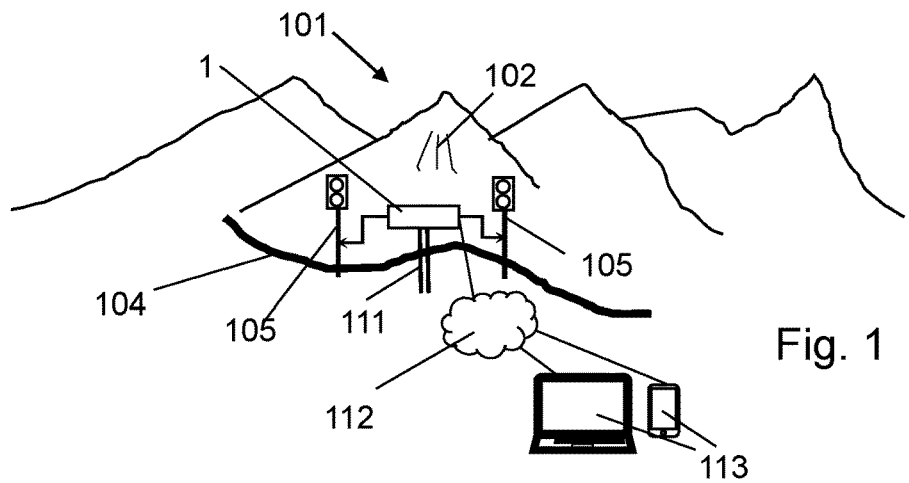
FIG. 1 a radar device in a possible application situation.

FIG. 1 shows a radar device 1 of the type according to the invention, in one of many possible application situations. The radar device is stationary and is provided with its own mount 111, by way of which it is set up in the terrain in a stationary manner and can be anchored. The radar device is set up such that a monitoring region in a terrain 101 can be monitored. A danger region 102 from which, for example, rock fall or avalanches and/or mudslides are to be feared, and which could endanger a road 104 that leads through therebelow is drawn schematically in FIG. 1. As is known, per se, for example from DE 10 2017 106 851 or from DE 10 2018 104 281, the radar device 1 is configured to control signal facilities 105, by way of which the road below the danger region 102 can be blocked if a dangerous event has been ascertained. Since the monitoring region can be relatively large—a typical distance between the radar device and the monitoring region is between a fraction of a kilometre and several kilometres, for example 0.5-5 km—the measures to be taken can also be dependent on where the potentially harmful event has been ascertained, which is likewise described in DE 10 2018 104 281. Additionally or alternatively, the radar device can be provided with a communication unit, via which it can send measurement results, for example, via a network 112 to at least one external device 113 and via which it can also receive, for example, programming commands.

Apart from the monitoring of a natural terrain, which is represented in FIG. 1, a possible application of a radar device of the type according to the invention is also the monitoring of huge constructions such as dams, dikes the like. The connection to a signal facility or the like is advantageous or is also not necessary depending the selected use. For example, one can also envisage an alarm simply being activated on determining an imminent event or one that has already began, and the necessary measures then be activated by an operating person.

In contrast to Doppler radar devices according to the state of the art, the radar device 1, in addition to detecting events in real time, also permits the highly-resolved imaging of a terrain in the monitoring region as well as the detection of very slow movements or of movements of a medium speed which, will be dealt with in more detail hereinafter.

Figure 2:
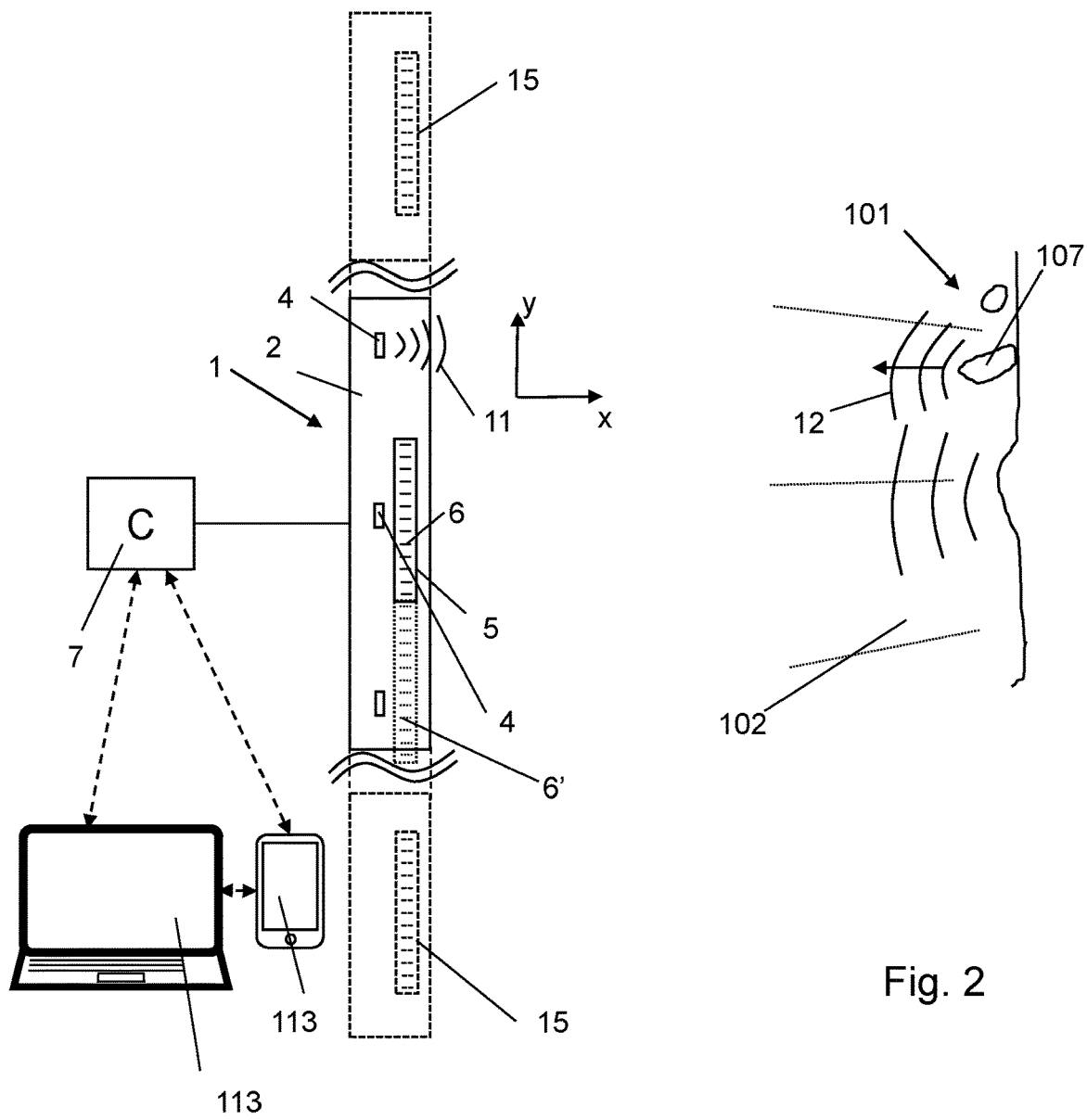
FIG. 2 a schematic diagram of the radar device with transmitting antennae, receiving antennae and control and evaluation unit.

As is schematically represented in FIG. 2, the radar device includes a housing 2 that is assembled in a stationary manner, for example with a mount 111 of the aforementioned type, as well as a plurality of transmitting antennae 4, which is arranged in a stationary manner relative to the housing. The transmitting antennae are arranged distanced to one another at predefined distances with respect to a horizontal direction (y-direction; azimuth direction). Apart from this, the radar device likewise includes a module 5, which is likewise arranged in a stationary manner during the operation, and which is with an arrangement of several receiving antennae 6, which are likewise arranged in predefined, essentially regular distances and distanced to one another in the same horizontal direction (y). The distances of the adjacent receiving antennae do not have to be precisely the same, but can also slightly differ in a defined and known manner. This can even be advantageous since slightly varying distances can be used in order to reduce artefacts on evaluation.

The distance of the receiving antennae to one another can correspond to a value between roughly half a wavelength and a wavelength, i.e., at 17 GHz between just short of 0.9 cm and just short of 1.8 cm. The distance between the transmitting antennae 4 can correspond roughly to the number of receiving antennae in a module 5 multiplied by their number, thus in the present example given 16 receiving antennae approx. 15 cm to 30 cm.

Further virtual receiving antennae 6' result by way of the combination of the different transmitting antennae 4 with the receiving antennae 6 of the receiving antennae module. For example, the combination of the transmitting antennae 4, which is shown at the bottom in FIG. 2 with the receiving antennae 6 of the receiving antenna mode 5, corresponds to an arrangement of virtual receiving antennae 6', which are drawn in FIG. 2 below the receiving antenna module 5 in a dotted manner in combination with the transmitting antenna 4, which is drawn in FIG. 2 in the middle. In this manner, the MIMO principle enlarges the virtual aperture of the antenna arrangement.

In order to be able to enlarge the virtual aperture even further, furthermore further stationarily arranged receiving antennae modules 15 can be present.

The distance between the receiving antenna modules 5, 15 in the represented example. for example. corresponds roughly to the number of transmitting antennae 4 multiplied by their distance. As a whole and on account of the MIMO principle, an arrangement of in total n*m'*M virtual receiving antennae, which are distanced to one another at regular distances in the horizontal y-direction (corresponding to the distance of adjacent receiving antennae with a module) results, where n is the number of transmitting antennae, m' the number of receiving antennae per module and M the number of receiving antennae modules.

The same arrangement of virtual receiving antennae would also be achievable with a correspondingly larger number of transmitting antennae (for example, grouped in transmitting antenna modules), a larger number of receiving antennae per module or an arrangement of several receiving antenna modules directly next to one another combined with transmitting antennae, which are accordingly arranged at greater distances. The type of combination of transmitting and receiving antennae can be varied in this manner without compromising the functionally, which is yet to be illustrated hereinafter by way of FIG. 9-11.

The radar device also includes a control and evaluation unit 7, which is likewise configured for communication with the external device/external devices 113.

The control and evaluation unit includes various electronic components, which hereinafter to some extent are described in more detail. These can be designed in an integrated manner to a greater or lesser extent. In particular, the control and evaluation unit can also include components that are arranged at different locations and can be combined, for example, also with other entities, for example by way of them being implemented in an external computer or being integrated directly in an antenna. The control and evaluation unit is therefore to be understood as a unit in the functional sense and is not necessary also integrated physically.

The transmitting antennae 4—for example sequentially, as is yet explained hereinafter—generate primary radio waves 11, which are reflected back from the terrain 101, to which possibly moving objects 107 also belong, so that the thus arising secondary radio waves 12 can be detected by the receiving antennae 6.

Figure 3:
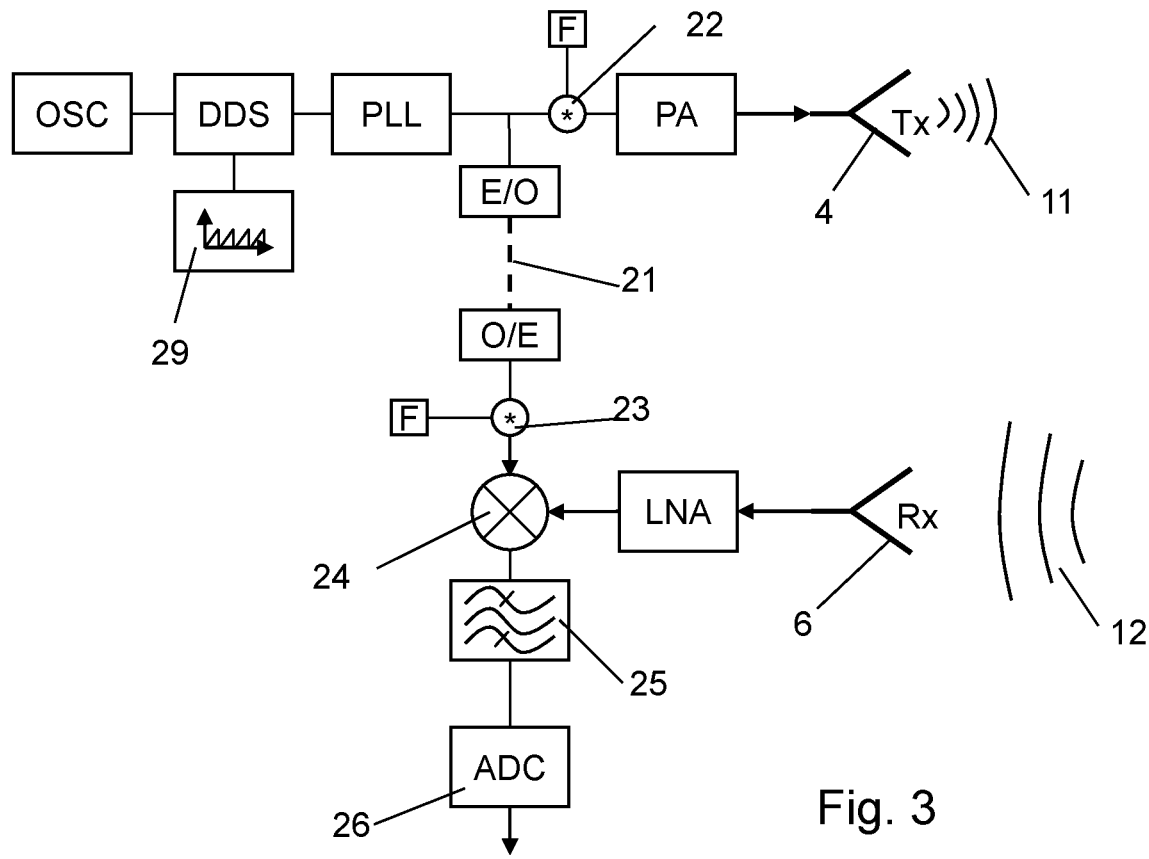
FIG. 3 a schematic diagram of electronic components of the radar device.

FIG. 3 shows a schematic diagram of elements of the control and evaluation unit each together with a transmitting antenna 4 and a receiving antenna 6. A clock generator OSC cycles a numerically controlled oscillator (DDS) which with the help of a control signal 29 generates a frequency ramp, which in turn serves as a reference for a downstream phase control loop with a high-frequency oscillator (PLL) and produces a frequency-modulated, phase-stable first signal, for example in a frequency band in the low Gigahertz region. A frequency multiplier 22, for example, from the first signal produces a higher-frequency emitting signal whose frequency is an integer multiple of the first signal (multiplication of the frequency by a factor F). The path via the frequency multiplier is optional, i.e., the oscillator can also be configured for generating the emitting signal in the desired frequency in a direct manner. The diversion via the less high-frequency first signal makes sense in particular in combination with the optical signal transmission, which is yet described in more detail hereinafter.

The frequency-modulated emitting signal has a frequency that is suitable for radio waves for the envisaged application and if applicable released by law. For example, it varies in a frequency band about 17 GHz. The emitting signal is amplified in a suitable manner, for example by way of a power amplifier PA and is fed to the transmitting antenna, which emits the corresponding primary radio waves 11.

On using several transmitting antennae, it is also possible to optically feed the signal to the various transmitting antennae. It is then converted electrically and is amplified with a power amplifier before the transmitting antennae.

Secondary radio waves 12, which are reflected back by the terrain, produce a receiving signal in the receiving antenna 6, the receiving signal after a suitable amplification (LNA) being mixed with the emitting signal (mixer 24). Herein, an individual mixer 24, which is located spatially in the direct vicinity of the receiving antenna, is generally assigned to each receiving antenna 6. In the embodiment of FIG. 3, it is not the emitting signal, but the first signal, which is transmitted to the location of the mixer, which is why a second frequency multiplier 23 must be present there, in order to generate the emitting signal with the frequency that is higher by a factor F.

As is known per se, a mixed signal results at the output side of the mixer 24, and this mixed signal includes signal components with the sum of the frequencies of the emitting signal and receiving signal as well as signal components with the differential frequency $\Delta f$. By way of a low-pass filter, the high-frequency components are filtered out, so that only signal components with the differential frequency $\Delta f$ are processed further. This filtered mixed signal is also denoted as an "intermediate frequency signal" in the present text. It provides information on the basis of the relationship that is represented schematically by way of FIG. 4 and that has already been known for some time for FMCW (frequency modulated continuous wave) radar devices of the type that are described here.

The radar device can include, for example, precisely one oscillator, wherein the emitting signal is fed to the respectively current transmitting antenna in a manner controlled by a switch, in the sequence that is yet explained hereinafter by way of examples. The radar device can furthermore each include a mixer and an A/D converter per receiving antenna, so that the receiving signals can be produced and detected in parallel. The emitting signal is therefore fed in parallel to the current transmitting antenna as well as to all receiving antennae.

On signal detection, a larger number of parallel receiving signals results with a high sampling frequency, which is necessary for a sufficiently good resolution and unambiguity regions, the receiving signals having to be processed very quickly in particular for the evaluation of the events at high speeds in real time. For this purpose, the control and evaluation unit can include suitable means for the very rapid execution of computation-intensive processing steps, for example Fourier transformations. For example, the signals from the A/D converters can be received and processed by way of at least one FPGA (field programmable gate array) or a GPU of the control and evaluation unit.

Figure 4:
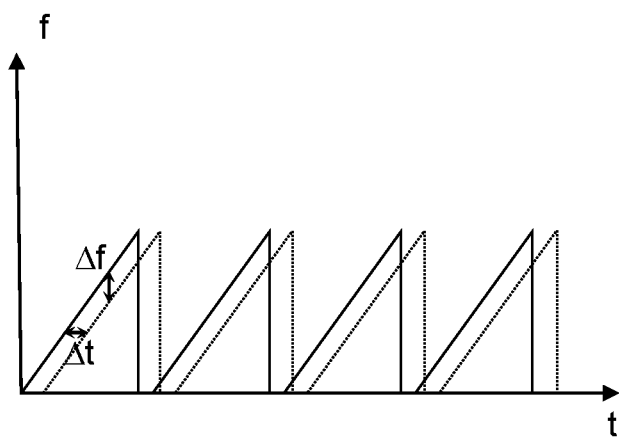
FIG. 4 the principle of the dependence between the delay of the radar echo on the one hand and the frequency of the intermediate frequency signal on the other hand.

FIG. 4 schematically shows the frequency as a function of time for a succession of chirps, wherein the emitting signal is represented in unbroken lines and the receiving signal in a dotted manner. The delay of the receiving signal (echo) $\Delta t$ effects a frequency difference $\Delta f$ between the emitting signal and receiving signal, the frequency difference being dependent on $\Delta t$ and the course of the chirp. Given a linear frequency modulation, as illustrated, the delay $\Delta t$ is proportional to the frequency difference $\Delta f$, at least if one were to ignore possible Doppler shifts of the receiving signal. Since $\Delta t$ is proportional to the covered path and, thus, to the distance between the radar device and the reflection location, the "range" resolution results in an essentially direct manner from the spectrum of the intermediate frequency signal.

Additionally to the mentioned low-pass filter, whose significance has been explained by way of FIG. 4, also a high-pass filter can be applied to the mixing signal, in order to filter out very low-frequency signal components, which in particular originate from reflections close to transmitting antenna. Such low-frequency signal components are of then comparatively high in energy and provide little information.

The functionalities of the low-pass filter and of the optional high-pass filter, in the embodiment of FIG. 3 are implemented in a bandpass filter 25, but it is also possible for the low-pass filter and the high-pass filter to be present as separate elements that are connected one after the other.

The resulting, possibly high-pass filtered intermediate frequency signal is fed to a subsequent evaluation after the analog-digital conversion.

Figure 5:
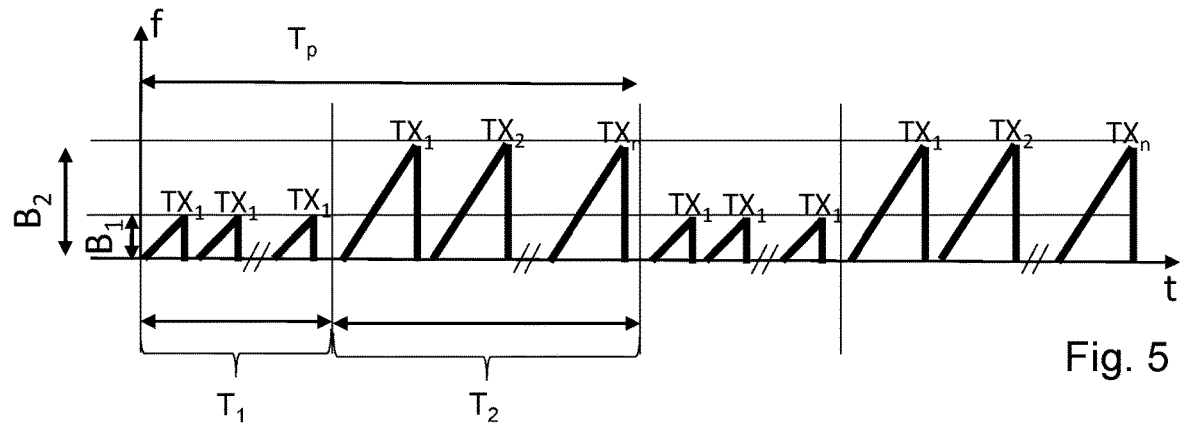
FIG. 5-7 in each case a succession of first and second sequences in three different operating modes.
Figure 6:
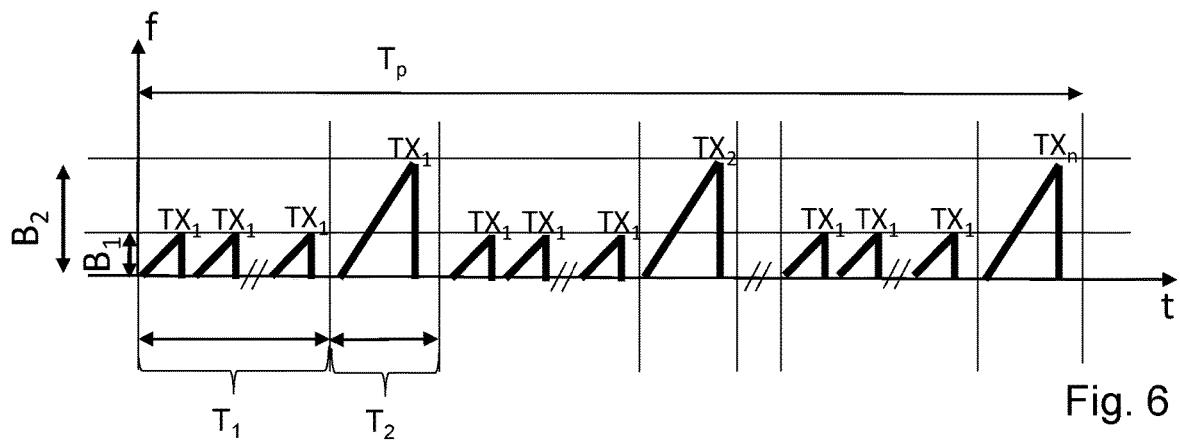
Figure 7:
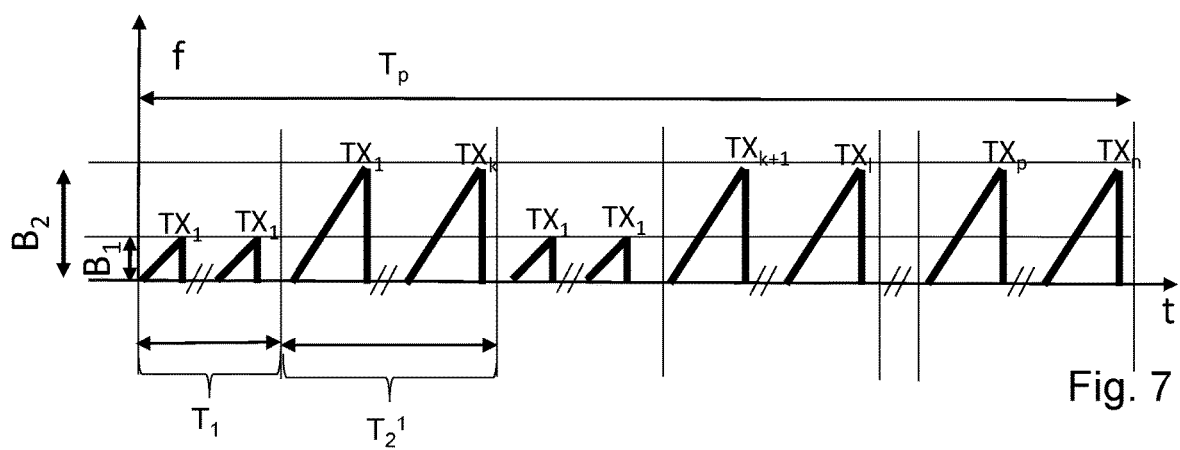

FIGS. 5-7 schematically show different possibilities for the transmitting antenna control.

During first sequences, successive chirps with a frequency bandwidth $B_1$ are fed as emitting signal in each case per sequence to the same transmitting antenna $TX_1$. As is illustrated in FIG. 5 (and as is also applied in the subsequent examples) one can use the same transmitting antenna in particular for all first sequences. Herein, the chirps are selected such that their repetition frequency is as large as possible, i.e., the chirp-to-chirp time duration is selected as small as possible. A first Fourier transformation can be carried out per chirp and provides a range resolution per chirp. On evaluation, the temporal development over the chirps can be evaluated in order to detect rapid movements in the terrain. In particular, this can be effected in a manner that is known per se from Doppler radar systems by way of a second Fourier transformation over the whole first sequence or at all events also over only a part of the first sequence, which result in the Doppler frequency shift as well as a (coarsely resolved) phase. The result of this evaluation is therefore a so-called 'range Doppler map'.

In particular, one can envisage the signal detection and mixing being carried out during the first sequences for a plurality of the receiving antennae, for example for all receiving antennae 6 of a module 5. By way of a comparison of signals, which are received by the different receiving antennae 6 of the one module, additionally to the resolution in range and the speed (Doppler frequency) resolution, one can also effect a coarse azimuth resolution, i.e., a resolution in the lateral angle by way of a so-called beamforming algorithm. Such a comparison can be effected for example analogously to an evaluation of interferometry radar signals, wherein the achievable accuracy is limited by the aperture, i.e., the horizontal extension of the respective receiving antennae module 5 is limited.

The frequency bandwidth $B_1$ which determines the range resolution can be adapted in accordance with requirements. Specifically, the frequency bandwidth $B_1$ can be selected comparatively small. This, on the one hand, is because the frequency difference $\Delta f$ is also proportional to the steepness of the frequency rise per flank (see FIG. 4) and given higher intermediate frequency values the signal detection and processing effort is larger than with smaller intermediate frequency values on account of the higher sampling rate which becomes necessary—which is why the flanks cannot be selected in an arbitrarily steep manner. On the other hand, the maximal unambiguously detectable speed with the described method is directly dependent on the repetition frequency of the chirps, which is why the chirps must be short. For example, it can be advantageous if the chirp-to-chirp time is not larger than between 40 and 100

The time duration $T_1$ of a first sequence is computed by the number N of chirps per first sequence—expediently for a sufficiently good signal-to-noise ratio for example at least a few hundred, for example 512—multiplied by the chirp-to-chirp time. The number of first chirps required in practise depends on the minimum radar cross section (RCS) of an object to be observed, as well as on the distance; the smaller are the objects that are to be detected and the more distanced they are, the larger does the so-called Doppler gain have to be. The gain rises with the number of first chirps per first period. With a large N, the fact that concerning the moved objects the distance to the radar device also changes during the first sequence is of relevance under certain circumstances and this effect must be taken into account with the Fourier transformation.

The second sequences serve for obtaining an imaging of the monitored terrain, which is angularly resolved to an improved extent and in particular also in order to measure slow movements and changes. For this purpose, firstly the second chirps of the second sequences are emitted by different transmitting antennae, in the represented embodiment examples sequentially, i.e., in each case not simultaneously. Secondly, the second chirps have a comparatively large bandwidth. In particular, the bandwidth of the second chirps is larger than that of the first chirps, for example by at least a factor of 3 or by a factor 5, 8 or more.

However, as is also illustrated, for example in FIGS. 5-7, one can envisage the steepness of the chirps of the first and second chirps being the same. "Steepness" here is denoted as the change $\partial f/\partial t$ of the frequency of the primary radiation per unit of time, i.e., given a frequency increase or frequency decrease, which is linear as a function of time, the gradient of the respective flanks. An equal steepness of the first and second chirps has the advantage that the intermediate frequency signal is in the same frequency region during the first and second sequences.

In FIG. 5, the second sequences each include a chirp from each of the transmitting antennae, i.e., the transmitting antennae successively emit a chirp, in order to form a second sequence. The scattered back secondary radio waves, which are generated as a reaction to the respective primary radio waves, are detected by each of the receiving antennae. In total n*m signals result, wherein m is the number of receiving antennae and n the number of transmitting antennae.

The evaluation of the second receiving signals, i.e., of the receiving signals that originate from the second chirps, is effected, for example, by way of approaches as are known per se from radar interferometry, with the particularities that are explained in more detail hereinafter. Whilst using trigonometric relations, an imaging, which is resolved in the azimuth angle, results from the phase differences between the different second receiving signals (whilst using a so-called "phase unwrapping" for eliminating ambiguities). A phase comparison in dependence on time furthermore points to slow movements in the terrain. The maximal thus observable and unambiguously ascertainable speed is given by the period $T_p$, i.e., by the time duration of a complete cycle corresponding to the time duration between two second chirps $TX_i$ that depart from a certain transmitting antenna. In the embodiment example of FIG. 5, this time duration $T_p$ corresponds to the sum of the time duration $T_1$ of a first sequence and the time duration $T_2$ of a second sequence. If a movement is quicker than $v_{max,I}=\lambda/4*(1/T_p)$, then due to the aliasing effect it can no longer be unambiguously differentiated from a slow movement solely by way of a phase comparison.

Without further ado, it is realistic that $v_{max,I}$ is significantly larger than the speeds of maximally a few metres per year, which until now were determined in the state of the art by way of evaluating interferometric measurements. If for example—as an example with randomly but realistically selected number values—one were to assume 512 chirps with a chirp-to-chirp duration of 70 µs during a first sequence and 5 chirps with a chirp-to-chirp time duration of 600 µm, then a period of 38.84 ms results for $T_p$ which via $v_{max,I}=\lambda/4*(1/T_p)$ at 17 GHz corresponds to a speed of more than 100 mm/s.

If $v_{max,I}$ is of the same magnitude as the minimal speed $v_{min,d}$ which can be resolved by the evaluation of the first sequences, then the procedure according to the invention for the first time permits essentially the whole speed spectrum to be covered, without gaps at medium speeds.

If, as in the embodiments represented here, the first sequences and the second sequences are not simultaneous or overlapping, but one after the other, the monitoring of very rapid events is interrupted during the second sequences. If such a rapid event (avalanche, rock fall, etc.) begins during a second sequence, then from this and in the most unfavourable case a certain lengthening of the best possible reaction time by maximally the length of a second sequence results. For many applications, such delays of the magnitude of a few milliseconds (3 ms in the number example specified above) are absolutely tolerable and do not significantly include the functionality of the complete radar device. The detectability of medium sized speeds of typically a few millimetres per second is to be weighted more greatly with such applications, since from this results the possibility of reacting already before the beginning of events, by way of the event being announced by way of increased movements at such medium speeds in the terrain, generally shortly before the release of an avalanche or a rock fall or shortly before a dam break.

In the case that such an interruption of the first sequences for milliseconds cannot be tolerated in very specific application cases, the subdivision between first and second sequences can also be selected in another manner, so that the second sequences—and herewith the "interruptions"—become shorter, wherein in turn the unambiguity region of the detectable medium speeds becomes smaller.

FIG. 6 illustrates a corresponding example, in which the second sequences only each include a single chirp and the second chirps are each emitted by different transmitting antennae from second sequence to second sequence. The time duration $T_2$ of a second sequence, by which the monitoring of rapid events is interrupted, is then correspondingly smaller. In exchange, the time duration $T_p$ between two second chirps that are emitted by the same transmitting antennae increases, since it includes several—corresponding to the number of transmitting antennae—first sequences, so that the unambiguity region of the speeds of movements detected via second sequences is correspondingly smaller.

FIG. 7 finally shows the general case, of which the embodiments of FIGS. 5 and 6 represent special cases. Per cycle, several second sequences can be present and these in principle can have different lengths, wherein the number of the second chirps adds over all second sequences per cycle into the total number, which, in the examples that are represented here, corresponds to the number of transmitting antennae. In particular, one can envisage the second sequences each being equally long, which apart from in the special cases of FIGS. 5 and 6 presupposes the number of transmitting antennae not being a prime number. For example, given six transmitting antennae, two second sequences each with three chirps or three second sequences each with two chirps can occur per cycle.

A respective equal number of second chirps per second sequence simplifies the evaluation of the measurement results which are generated by the second sequences. This being due to the fact that the correction of the measured phases requires more effort if the length of the second sequences is not equal: the monitored terrain indeed possibly also moves between the chirps. These phases must be corrected before the virtual receiving antennae of a complete measurement can be computed over the chirps of all n transmitting antennae. This is potentially simpler if the phase difference from chirp to chirp can be assumed as being constant.

Generally, the radar device is configured to cyclically repeat the succession of the first sequences and of the second sequences, wherein as mentioned the cycle length $T_p$ is particularly short if, as in FIG. 5, the second sequences each include chirps of all transmitting antennae.

The radar device can be configured to always run in the same operating mode, i.e., the length of the second sequences can be configured in a fixed manner. However, it is also an option for the radar device to permit a setting of the operating mode and thus for the length of the second sequences—and herewith the length $T_p$ of the complete cycles as is explained by way of FIG. 5-7—to be able to be selected and thus adapted to the current demands.

Such an adaption can also be carried out automatically by the control and evaluation unit 7 or by an external device. If, for example, accelerated regions are recognised in a mode as is represented in FIG. 6, then one can change to a mode as is represented in FIG. 5, in order to be able to track this acceleration even longer interferometrically with the second sequences and with higher maximal speeds.

The relationship that is already outlined above, that the frequency bandwidth determines the resolution in range, the length of the sequences the speed resolution, the temporal interval of two chirps that are used for the speed measurement (i.e., in the ideal case of directly consecutive chirps the time duration of the chirps) the maximal determinable speed and the time duration of a measurement the signal-to-noise ratio, is very generally the case. Against this background, the parameters can be adaptively selected, for example given the determining of an event, the measurement value that characterises this event in a particularly informative manner being measured particularly quickly and/or particularly accurately. There is also the possibility, if of an event one knows in which azimuth region this takes place, of being able to measure in only this direction.

The evaluation of the signals which correspond to the second sequences, in embodiments can be effected as follows:

In a first step, as with the aforedescribed evaluation of the first sequences, a so-called range Doppler map is computed per transmitting antenna—receiving antenna combination each by way of a Fourier transformation, i.e., the frequency and phase are detected as a function of the distance (range).

In a second step, the correction of the phases of moved objects is effected. This is necessary since the transmitting antennae do not emit simultaneously and the objects could have moved between recordings. The range Doppler maps, which correspond to the receiving signals that are produced by the various transmitting antennae, represent the monitored region at different points in time. The adaptation is effected whilst taking into account the temporal interval between the second chirps such that the adapted range Doppler maps correspond to a momentary recording at a same point in time.

In a third step, the so-called beamforming is effected, i.e., the computing of a range Doppler map for each azimuth angle or indeed a phase picture as a function of range and azimuth. Corresponding imaging evaluation methods, with which from a comparison of range Doppler pictures of receiving signals from different receiving antenna positions, corresponding different aspect angles are acquired, are known per se. They have been developed in particular for the so-called SAR interferometry (synthetic aperture radar interferometry), concerning which a synthetic antenna apparatus is achieved by way of the transmitting and receiving antenna being moved along a so-called baseline (corresponding to the line in the y-direction in FIG. 2, along which the antennae are rowed). Corresponding evaluation software is commercially available.

The following generally applies to aspects and embodiments of the present invention:

Particular challenges can result firstly on evaluating the temporal development of the phase pictures, since the atmospheric constraints change as a function of time. Secondly, challenges can result due to the fact that a distortion of the resolution in the azimuth (azimuth warping) can occur on account of slight inaccuracies on signal transmission over distances between the antennae as well as on account of the temporal staggering of the second chirps together with fluctuations of the atmospheric constraints.

For the elimination of the influence of atmospheric fluctuations as a function of time upon the temporal development of the phase pictures, the following method, for example, is suggested:

For determining medium speeds of for example a few mm/h to a few mm/s, interferograms (phase differences of pairs of interferometric measurements that are resolved in range and azimuth) are generated with recordings, which have arisen shortly after one another, for example within a second or a few seconds up to minutes. Here, a simple correction, for example, based on the assumptions that the constraints change in a simple manner, for example linearly as a function of time (sliding atmosphere model), is sufficient.

Figure 8:
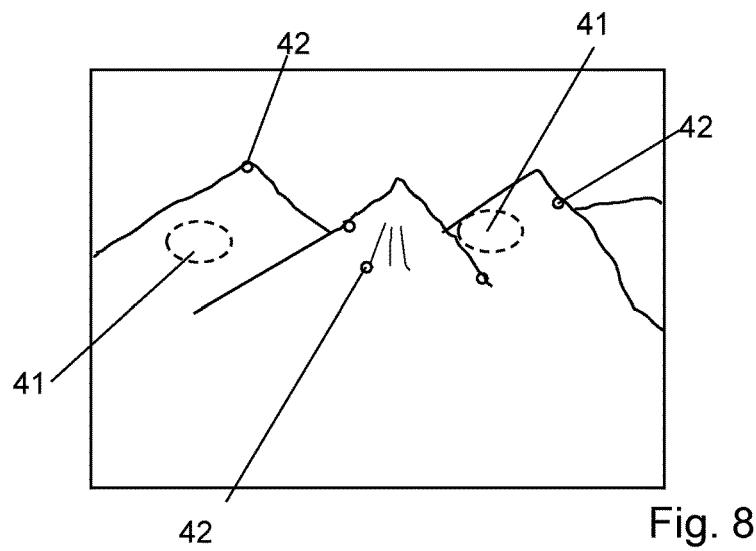
FIG. 8 the principle of the identification of stationary regions and/or characteristic points in the monitored terrain.

For determining very slow speeds of, for example, a few mm per year to mm/day, interferograms of measurements can be made, these having arisen at larger temporal intervals, for example at intervals of months. The atmospheric constraints as well as also the nature of surfaces etc. (e.g., due to ground humidity, snow covering, etc.) can fluctuate so greatly within such a large time interval that a simple correction of the aforementioned type is not sufficient. Instead of this, it is suggested to proceed as follows: on setting up the stationary radar device, at least one stationary region 41 (see FIG. 8) is identified and defined in the terrain. Such stationary regions 41 are regions of which it is known on account of geological conditions that no slow terrain movement is to be expected. For the evaluation during the operation, interferograms are computed from pairs of recordings that have arisen after one another at a larger temporal interval of, for example, a few months. In a first evaluation step, pairs of recordings that have successively arisen at roughly the same temporal interval and concerning which the pictures of the stationary regions 41 correspond as well as possible to one another are sought. Picture processing algorithms, which can identify the similar as possible recordings, can be used for this. Of such recording pairs with good as possible corresponding pictures of the stationary regions 41, the phase pictures of other regions are compared, in order to determine movements in the terrain.

A stationary region 41 of the described type can at all events be used in order to compensate travel time changes at the cables and in the electronics as a result of temperature fluctuations and/or ageing.

A new type of method is also suggested for eliminating distortions in the azimuth. The fact that not only the phase picture, but also the amplitude picture, i.e. the receiving signal amplitude as a function of the resolved coordinates "range" and azimuth" are characteristic of the terrain is utilised. In particular, characteristics points 42 in the terrain can also be identified in the amplitude picture. Such characteristic points 42 can be distinguished by their particular position or particular nature (reflection characteristics). The use of characteristic patterns instead of characteristic points is also possible. It is suggested to correct the dependency of the picture on the azimuth angle in the context of equalisation such that the characteristic points 42 are imaged onto the—prior known—azimuth coordinate. An equation system can be set up for this purpose, with the equalisation corrections (the noisy phase differences between RX antennae or different TX antennae) as unknowns, by way of which system the current amplitude picture is imaged onto a reference amplitude picture—with the characteristic points at the correct location.

According to a particular embodiment, for obtaining such a reference amplitude picture on setting up the stationary radar device, a calibration measurement is carried out as follows: The characteristic points 42 in the terrain are identified and a drone is controlled and programmed such that its flight path corresponds to a section of a straight beam between the respective characteristic point 42 and the radar device. The drone is captured by the radar device during this flight. The real azimuth angle of the drone location during the flight results from the flight path of the drone. This procedure is repeated in a timely manner for different characteristic points 42. The amplitude picture, which is recorded during this drone flight, is used for generating the reference amplitude picture, wherein an equalisation correction is carried out on the basis of known drone azimuth angles during the differently carried out flights.

The evaluation of the measurements that are effected during the second sequences (of the second receiving signals), despite the possibility of equalisation corrections of the aforedescribed type, creates a particularly high stability of the phases. This also means that the measuring accuracy is very sensitive to phase shifts between the emitting signal and the associated receiving signal, caused by the apparatus. Such can result in practise, for example, if the corresponding analog signal must be transmitted over longer distances, for example due to temperature fluctuations and length and other dimensional fluctuations that are caused by this.

For this purpose, according to the second aspect of the invention, one suggests the transmission of the emitting signal—for example in the form of the first signal, from which the high-frequency emitting signal is obtained by way of frequency multiplication—being effected optically over larger distances. In the example illustrated in FIG. 2, on using several receiving antenna modules, in particular larger distances from the oscillator (formed from the clock and phase control loop) to the receiving antenna modules result. For this reason, in FIG. 3 one suggests transmitting the first signal to the mixer 24 via an electrical-optical converter (E/O) in the proximity of the oscillator, an optical signal lead and an optical-electric converter (O/E) in the vicinity of the corresponding receiving antenna module. Particularly with arrangements with transmitting antenna, which are arranged further remotely from one another (for example, of the transmitting antenna are arranged on a different circuit board than the oscillator, in combination with a larger receiving antenna module and/or on using particularly many transmitting antennae), the transmission of the emitting signal or of the first signal to the transmitting antennae can supplementarily or alternatively be effected optically.

The generation of the first signal of a somewhat lower frequency and the obtaining of the emitting signal from this signal by way of frequency multiplication (frequency multipliers 22, 23 in FIG. 3)—inasmuch as one is not dependent on the phase coherence of emitting signal, upon which the signal that is used for the mixing at the mixer is reliant—makes particular sense in the context of the optical transmission of the signal for the following reason: The optical transmission of signal with frequencies of for example 17 GHz would be relatively complicated and for this reason the components that are required for this are not obtainable on the market without further ado or are expansive. The procedure with the generation of the first signal of a somewhat lower frequency in combination with the frequency multiplication in front of the power amplifier PA or the mixer 24 solves this problem in an elegant manner and thus permanently improves the economics.

Figure 9:
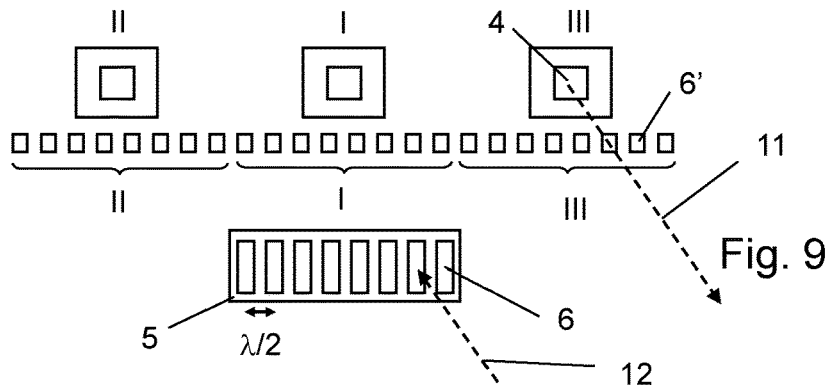
FIG. 9 -11 in each case a schematic diagram for the arrangement of transmitting antennae and receiving antennae with resulting virtual receiving antennae.

FIG. 9 shows an arrangement of a receiving antenna module 5, which is similar to FIG. 2, with a plurality of receiving antennae 6 that are arranged at a regular distances, as well as with three transmitting antennae 4 (transmitting antennae I-III). Given an object that throws back the secondary radio waves 12 and which is arranged at a greater distance, the difference between the path distance of radiation that departs from two different ones of the transmitting antennae 4 is the same as if the radiation were to come from a single transmitting antenna and were to be incident upon receiving antennae which are arranged at a corresponding distance to one another. The drawn arrangement therefore with respect to this is equivalent to an arrangement with a single transmitting antenna 4—corresponding to the first antenna—in combination with a correspondingly enlarged array of—virtual—receiving antennae 6'. The virtual receiving antennae 6' could be assigned according to the physical transmitting antennae (group II, I and III). If the transmitting antennae emit the second chirps successively, then the signals of the virtual receiving antennae 6' of the respective group are detected one after the other.

Figure 10:
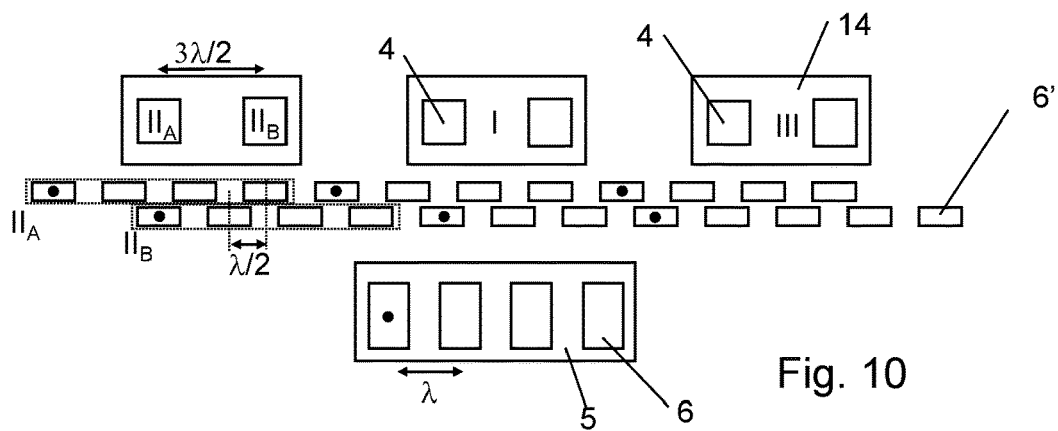

FIG. 10 shows an alternative arrangement—likewise with only a single receiving antenna module 5. In this embodiment, the distance of adjacent receiving antennae is larger (here corresponding to a whole wavelength λ instead of merely half a wavelength as in the previously described embodiment examples). For this, the arrangement of the transmitting antennae 4 is such that the virtual receiving antennae 6' from a staggered arrangement. In the represented example, this staggered arrangement results from the transmitting antennae 4 forming groups of each two transmitting antennae that are arranged at a distance of one and a half wavelengths to one another. Groups at a distance of half a wavelength or five wavelengths, etc., would also result in this effect. For illustration, those virtual receiving antennae, which correspond to the real receiving antennae 6 at the far left, are characterised by a dot in FIG. 10.

The embodiment of FIG. 10 as other embodiments with real receiving antennae, which are arranged at a somewhat larger distance to one another, has the advantage that the receiving antennae can be used with a larger gain.

Figure 11:
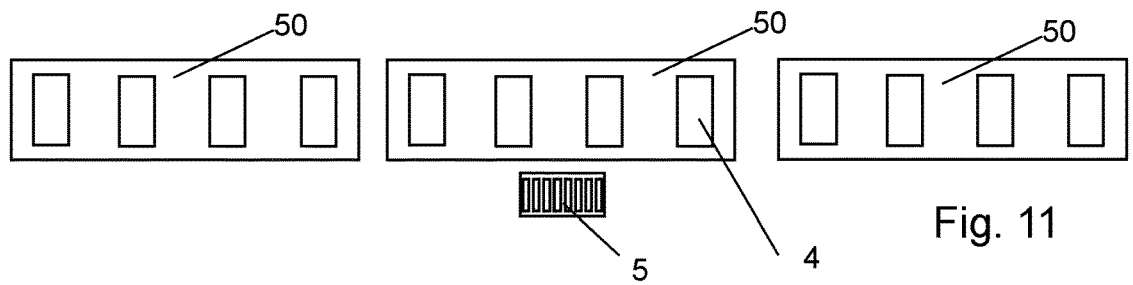

FIG. 11 finally shows a particularly simple arrangement with only one receiving antennae module 5 but with several transmitting antenna modules 50 each with a plurality of transmitting antennae 4. The distances of adjacent transmitting antennae 4 correspond to the "width" of the receiving antenna module, i.e., to the number of receiving antennae multiplied by the distance of adjacent receiving antennae.

Embodiments with transmitting antennae modules or with several receiving antenna modules permit a simple adaptability of the hardware to user-specific requirements: Depending on the demands on the azimuth resolution, a larger or smaller number of modules can be used.

Numerous further combinations of transmitting and receiving antennae that result in a regular arrangement of virtual receiving antennae 6' are conceivable.

The invention claimed is:

1. A radar device for detecting object movements in a monitored terrain, comprising:
    at least one stationary transmitting antenna for emitting primary radio waves,
    a plurality of stationary receiving antennae for generating receiving signals that are caused by secondary radio waves, which are thrown back by the terrain on account of the primary radio waves;
    and a control and evaluation unit;
    wherein the control and evaluation unit is configured to generate a frequency-modulated emitting signal that initiates the transmitting antenna or at least one of the transmitting antennae into emitting primary radio waves,
    wherein the control and evaluation unit is configured to cause the emitting of successive primary radio wave chirps by way of the at least one transmitting antenna and from a temporal development of a corresponding first receiving signal, which originates from successive primary radio wave chirps, to determine a Doppler shift and/or a speed and wherein the control and evaluation unit is further configured, from a comparison of second receiving signals, which originate from selected primary radio wave chirps and which are caused by different receiving antennae, to determine an azimuth resolution, in order to create azimuth-resolved data sets, and from a comparison between data sets that do not correspond to directly consecutive primary radio wave chirps, to determine a temporal development of azimuth-resolved data sets.

2. The radar device according to claim 1, wherein the control and evaluation unit is configured to cause the emitting of first sequences of in each case a plurality of first successive primary radio wave chirps and to use the temporal development of a first receiving signal, which corresponds to these first primary radio wave chirps, for determining the Doppler shift and/or speed, and wherein the control and evaluation unit is further configured to cause the emitting of second sequences of in each case at least one second primary radio wave chirp and to use these as the selected primary radio wave chirps.

3. The radar device according to claim 2, wherein the second chirps have a broader spectrum than the first chirps.

4. The radar device according to claim 2, comprising a plurality of stationary transmitting antennae, wherein the second primary radio wave chirps are created by the transmitting antennae, which are different within the second sequences and/or between the second sequences, and wherein the azimuth resolution is determined from a comparison of the second receiving signals, which correspond to the second chirps which depart from the different transmitting antennae and are caused by the different receiving antenna.

5. The radar device according to claim 4, wherein the transmitting antennae form a row of transmitting antennae that are arranged at distances to one another.

6. The radar device according to claim 4, wherein a distance between two adjacent transmitting antennae and a distance between two adjacent receiving antennae are matched to one another such that an array of virtual receiving antennae being arranged at regular distances results from the possible combinations of transmitting antennae positions with the receiving antennae positions.

7. The radar device according to claim 6, wherein a distance between two adjacent virtual receiving antennae is between 0.5 cm and 3 cm.

8. The radar device according to claim 4, wherein the control and evaluation unit is configured to initiate each transmitting antenna into emitting precisely one second chirp within a cycle comprising one or more first sequences and an equal number of second sequences.

9. The radar device according to claim 2, wherein the first chirps and the second chirps each have a frequency increase or frequency decrease which is linear as a function of time, and wherein the frequency increase or frequency decrease of the first and second chirps is the same.

10. The radar device according to claim 2, wherein the second sequences with regard to time are between the first sequences.

11. The radar device according to claim 2, which is configured to adapt a length of the first sequences and/or a length of the second sequences in an adaptive manner on the basis of the determined values.

12. The radar device according to claim 1, wherein the control and evaluation unit is configured, by way of comparing successively obtained phase pictures that are computed from the second receiving signals, to determine movements in the monitored terrain and to compute their speed.

13. The radar device according to claim 1, wherein the control and evaluation unit is configured, for an evaluation of the first receiving signal, to carry out a first Fourier transformation per chirp in order to obtain a range resolution, and is configured to subsequently carry out a second Fourier transformation over the successive chirps for determining a Doppler shift and/or a speed.

14. The radar device according to claim 1, wherein the control and evaluation unit is configured, for an evaluation of the second receiving signals, to carry out a first Fourier transformation per chirp, in order to obtain a range resolution and to subsequently process the Fourier-transformed second receiving signals of the different receiving antennae into a phase picture in dependence on range and azimuth.

15. The radar device according to claim 1, wherein an upper limit of the speed which can be unambiguously determined from the first receiving signal lies between 5 m/s and 200 m/s and wherein for example a lower limit of this speed lies between 0.02 m/s and 1 m/s.

16. The radar device according to claim 1, wherein an upper limit of speeds which can be unambiguously determined by the comparison of the second receiving signals lies between 1 mm/s and 1 m/s, in particular between 100 mm/s and 300 m/s or 100 m/s.

17. The radar device according to claim 1, wherein the control and evaluation unit is configured to determine a Doppler shift or a speed as a function of at least one distance coordinate as well as a function of the azimuth angle, also from the first receiving signals of different receiving antennae.

18. The radar device according to claim 1, comprising an oscillator for generating the emitting signal as well as per receiving antenna a mixer whose one input is connected to the oscillator and whose other input is connected to the receiving antenna, by which means the mixer is configured to mix the receiving signal with the emitting signal in order to obtain an intermediate frequency signal which can be digitalised for determining the temporal development and the comparison.

19. The radar device according to claim 1, comprising at least one receiving antenna module which comprises a row of receiving antennae at regular distances.

20. The radar device according to claim 1, comprising a plurality of receiving antenna modules each with a row of receiving antennae and/or a plurality of transmitting antenna modules each with a plurality of transmitting antenna.

21. The radar device according to claim 1 wherein the control and evaluation unit furthermore comprises at least one mixer, in which the emitting signal and the receiving signal are mixed, in order to obtain an intermediate frequency signal, wherein the control and evaluation unit further comprises an electrical-optical converter (E/O), an optical signal lead and an optical-electrical converter (E/O) and is configured to transmit the emitting signal after its generation to the mixer and/or to the transmitting antenna or at least one of the transmitting antennae, via the electrical-optical converter (E/O), the optical signal lead and the optical-electrical converter (O/E).

22. The radar device according to claim 21, wherein the emitting signal is generated as a first signal and the control and evaluation unit is configured, at the input side of the at least one transmitting antenna and of the mixer to carry out a multiplication of the frequency by a fixed factor (F), wherein the transmission of the emitting signal as the first signal is caused via the electrical-optical converter (E/O), the optical signal lead and the optical-electrical converter (O/E).

23. The radar device according to claim 21, comprising a plurality of stationary transmitting antennae that are arranged at a distance to one another.

24. The radar device according to claim 1, wherein the at least one stationary transmitting antenna and the plurality of stationary receiving antennae are immovably fixed in a location with respect to ground.

25. A method for operating a radar device for detecting object movements in a monitored terrain, wherein the radar device comprises:
   at least one stationary radio wave transmitting antenna for emitting primary radio waves,
   a plurality of stationary radio wave receiving antennae for generating receiving signals which are caused by secondary radio waves, which are thrown back from the terrain on account of the primary radio waves;
   and a control and evaluation unit;
   wherein the method comprises the emitting of frequency-modulate primary radio waves by the transmitting antenna or at least one of the transmitting antennae and the generating of a receiving signal on the basis of the thrown-back secondary radio waves by at least one of the receiving antennae,
   wherein the method comprises the following steps;
   emitting first sequences of in each case a plurality of first successive primary radio wave chirps by the transmitting antenna or precisely one of the transmitting antennae;
   detecting a temporal development of the first receiving signal which corresponds to the first sequences and determining a Doppler shift and/or the first speed from the temporal development of the first receiving signal;
   emitting second sequences of in each case at least one second primary radio wave chirp;
   detecting in each case a second receiving signal which corresponds to the second sequences, by a plurality of receiving antennae;
   comparing second receiving signals which are caused by different receiving antennae, in order to obtain a phase picture which is resolved in the azimuth,
   wherein movements in the monitored terrain are computed from a temporal development by way of a comparison of successively obtained phase pictures.

26. The method according to claim 25, wherein the radar device comprises a plurality of stationary transmitting antenna, wherein the second primary radio wave chirps are created by the transmitting antennae which are different within the second sequences and/or between the second sequences, and wherein the azimuth resolution is determined from a comparison of the second receiving signals which correspond to the second chirps which depart from the different transmitting antennae and are caused by the different receiving antennae.

27. The method according to claim 25, wherein the second chirps have a broader spectrum than the first chirps.

28. The method according to claim 25, wherein movements with second speeds between 1 mm/year and 300 mm/s are determined by way of the comparison of successively obtained phase pictures.

29. The method according to claim 25, wherein for eliminating fluctuations of the atmospheric conditions, stationary regions in the terrain are defined, wherein for computing the movements, pairs of measurements, which lie apart temporally and concerning which the phase pictures in the region of the stationary regions are as similar as possible are identified, and wherein these pairs of measurements are used for the comparison.

30. The method according to claim 25, wherein after the comparing or on comparing, a correction of distortions is carried out, wherein this correction comprises the acquisition of an amplitude picture, the identification of characteristic points and patterns in the amplitude picture and the displacement of the azimuth coordinate such that the position of the characteristic points or patterns in the amplitude picture corresponds to the position of the characteristic points or patterns in a reference amplitude picture.

31. The method according to claim 30, wherein for producing the reference amplitude picture, the characteristic points or patterns in the terrain are identified and a drone is captured by the radar device during a flight on a beam between the respective characteristic point or pattern and the radar device, in order to define the azimuth angle.

32. The method according to claim 25, wherein the first chirps and the second chirps each comprise a frequency increase or frequency decrease which is linear as a function of time, and wherein the frequency increase or frequency decrease of the first and second chirps is the same.

33. The method according to claim 25, wherein the second sequences are between the first sequences.

34. The method according to claim 25, wherein precisely one second chirp is emitted by each transmitting antenna within a cycle that comprises one or more first sequences and an equal number of second sequences.

35. The method according to claim 25, wherein a first receiving signal is received from different ones of the receiving antennae, and wherein the Doppler shift or the speed is determined as a function of at least one distance coordinate and as a function of the azimuth angle.

* * * * *